United States Patent
Waldau et al.

(10) Patent No.: US 11,813,943 B2
(45) Date of Patent: Nov. 14, 2023

(54) METHOD AND DRIVE CONTROL DEVICE FOR OPERATING AT LEAST TWO ELECTRIC DRIVE MACHINES IN THE EVENT OF A CHANGE IN LOAD AND MOTOR VEHICLE WITH A DRIVE CONTROL DEVICE

(71) Applicant: AUDI AG, Ingolstadt (DE)

(72) Inventors: Arthur Waldau, Eichstätt (DE); Marcus Schiele, Nördlingen (DE)

(73) Assignee: AUDI AG, Ingolstadt (DE)

( * ) Notice: Subject to any disclaimer, the term of this patent is extended or adjusted under 35 U.S.C. 154(b) by 440 days.

(21) Appl. No.: 17/284,177

(22) PCT Filed: Aug. 29, 2019

(86) PCT No.: PCT/EP2019/073061
§ 371 (c)(1),
(2) Date: Apr. 9, 2021

(87) PCT Pub. No.: WO2020/088818
PCT Pub. Date: May 7, 2020

(65) Prior Publication Data
US 2021/0331592 A1 Oct. 28, 2021

(30) Foreign Application Priority Data
Oct. 30, 2018 (DE) ...................... 10 2018 218 605.7

(51) Int. Cl.
*B60K 1/02* (2006.01)
*B60L 5/20* (2006.01)
*B60K 17/356* (2006.01)

(52) U.S. Cl.
CPC .................. *B60L 5/20* (2013.01); *B60K 1/02* (2013.01); *B60K 17/356* (2013.01);
(Continued)

(58) Field of Classification Search
CPC ................ B60L 15/20; B60L 2220/42; B60L 2240/423; B60L 2240/80; B60K 1/02; B60K 17/356
See application file for complete search history.

(56) References Cited

U.S. PATENT DOCUMENTS

| | | | |
|---|---|---|---|
| 2015/0251541 A1 | 9/2015 | Drako et al. | |
| 2017/0028871 A1 | 2/2017 | Fukudome | |

FOREIGN PATENT DOCUMENTS

| | | |
|---|---|---|
| DE | 60104247 T2 | 7/2005 |
| DE | 102010053538 A1 | 6/2011 |

(Continued)

OTHER PUBLICATIONS

International Preliminary Report on Patentability dated May 14, 2021 in corresponding International Application No. PCT/EP2019/073061; 9 pages.

(Continued)

*Primary Examiner* — Mathew Franklin Gordon
(74) *Attorney, Agent, or Firm* — Maier & Maier, PLLC

(57) ABSTRACT

A method and a drive control device for operating at least two electric drive machines in the event of a change in load of a vehicle. A first torque can be transferred to at least one wheel of a first vehicle axle by a first electric drive machine, and a second torque can be transferred to at least one wheel of a second vehicle axle by a second electric drive machine. Each torque is defined by an amount and by a direction. In the method, it is determined whether a change in load is pending within a first defined timeframe and, if this is affirmed, the second torque is set for a second definable timeframe with a direction which is set opposite a current direction of the first torque.

20 Claims, 3 Drawing Sheets

(52) U.S. Cl.
CPC ..... *B60L 2220/42* (2013.01); *B60L 2240/423* (2013.01); *B60L 2240/80* (2013.01)

(56) References Cited

FOREIGN PATENT DOCUMENTS

| | | |
|---|---|---|
| DE | 112016005383 T5 | 8/2018 |
| EP | 2 097 304 B1 | 9/2011 |
| WO | 2012/116896 A1 | 9/2012 |

OTHER PUBLICATIONS

German Search Report dated May 27, 2019 in corresponding German Application No. 10 2018 218 605.7; 22 pages; Machine translation attached.
International Search Report (with English translation) and Written Opinion (with Machine translation) dated Nov. 5, 2019 in corresponding International Application No. PCT/EP2019/073061; 22 pages.

METHOD AND DRIVE CONTROL DEVICE FOR OPERATING AT LEAST TWO ELECTRIC DRIVE MACHINES IN THE EVENT OF A CHANGE IN LOAD AND MOTOR VEHICLE WITH A DRIVE CONTROL DEVICE

FIELD

The invention relates to a method for operating at least two electric drive machines in the event of a change in load of a motor vehicle as well as a drive control device for operating at least two electric drive machines. According to the invention, also provided is a motor vehicle having a drive control device.

BACKGROUND

In a vehicle with an electric motor and separately driven axles or wheels, i.e. one electric drive machine per driven axle, a tractive or regenerative torque is set on both drive machines, typically in the same direction. This means that, during accelerations, both drive machines supply a positive torque, and during braking or recovery, both drive machines supply a negative torque. During the transition from a propulsion mode into a traction mode, of a so-called change in load or load change, there is a change in contact among the drive components, power units, and toothed flanks. This change in load can occur, for example, during a trip or during startup.

This transition is often associated with a jolt or acoustically perceptible noise. This problem is known in the prior art and must be remedied with acoustic damping measures depending on component tolerances. These measurements are often very complex and require a high outlay of costs. In addition, the vehicle loses spontaneity. This means that a sporty design of the drive machines is only possible to a limited extent, which leads to a less sporty vehicle design. In addition, there are additional costs due to expensive damping measures.

DE 601 04 247 T2 discloses a method for accommodating the play in a drive system when a load change occurs. The drive system has a drive motor, which is preferably a combustion engine, which is coupled to a drivetrain in a vehicle. The drive system additionally has an electric motor, which exerts a drive or braking torque onto the drive motor and the drivetrain, in which the electric motor is coupled to the drive motor and forms a part of the drivetrain. In addition, a control system for controlling the electric motor is provided; if a load change is pending, this determines whether a drive or braking torque is required by the electric motor, and it transmits an individual pulse to the electric motor when a load change occurs, in which a torque pulse from the electric motor accommodates the play in the drivetrain before a torque stage of the drive motor starts.

DE 10 2010 053 538 A1 discloses a drivetrain in a motor vehicle with an internal combustion engine having crankshaft which can be connected to at least one gearbox input shaft of a gearbox. In order to damp drivetrain vibrations, a switchable eddy current brake is provided on a rotating component, between the internal combustion engine and a drive shaft of the gearbox.

SUMMARY

The object upon which the invention is based is to reduce the disadvantageous effects which occur during a change in load.

The invention provides a method for operating at least two electric drive machines in the event of a change in load of a vehicle, in which a first torque can be transferred to at least one wheel of a first vehicle axle by means of a first electric drive machine, and a second torque can be transferred to at least one wheel of a second vehicle axle by means of a second electric drive machine. In this case, each torque is defined by an amount and by a direction. In other words, the method can be used during operation of a vehicle which has at least two electric drive machines, in which one electric drive machine may be a three-phase machine which generates a moment or a torque. In this case, an electric drive machine may be attached to each respective axle of a vehicle, which drive machine generates a respective torque, which can be transferred to a wheel of the respective vehicle axle, in which a respective drive machine can transmit the torque to the respective wheel via a shaft and/or the respective electric drive machine is installed directly on the wheel such that the electric drive machine can transfer the torque directly to the wheel. It may be provided that the respective electric drive machines are arranged independently of one another per driven axle.

However, it is also conceivable that the electric drive machines are connected to one another via a drivetrain. The torque which is generated by each electric drive machine has an amount and a direction according to a vectorial representation.

The method comprises step a) determining whether a change in load is pending within a first definable timeframe and step b), in the event step a) is affirmed, setting the second torque for a second definable timeframe with a direction which is opposite a current direction of the first torque. In other words, the method can determine whether the change in load is pending within the first defined timeframe, and when this change is imminent, the second torque can be set opposite a current direction of the first torque. The change in load in this case may be the change in the torque upon a startup and/or the change in torque of an electric drive machine during a trip. A first defined timeframe may be, for example, a time span which requires an electric drive machine in order to establish a torque after a gas pedal is actuated. The second definable timeframe may be a time span in which the change in load occurs, i.e. the time span between a transition from a propulsion mode into a traction mode.

The method provides the advantage that a sportier setting of the vehicle can be selected such as, for example, during a rapid startup of the vehicle, a so-called race start, in which a drivetrain can be preloaded. In addition, it can be achieved that a jolt which is known from the prior art can be weakened, which may lead to increased comfort during road travel or when maneuvering and parking. Furthermore, wear can be reduced in the drive components, because the drive components, such as, for example, the toothed flanks, are no longer impacted with a high amount of force during the change in load but rather are rerouted into the desired direction by means of the method. In addition, discernible noises during the change in load can be diminished, whereby fewer acoustic insulating measures are necessary, which reduces the costs.

The invention also includes embodiments which result in additional advantages.

One embodiment provides that the first torque has an amount which is unequal to zero before the execution of step a), in which a load change is implemented in which the second torque changes its direction as the change in load. In other words, the vehicle can be in a driving mode, in which both torques may initially have one direction and the second torque can change its direction during the change in load by means of the method. The change in load in this case can be characterized as a load change during a trip. This provides the advantage that a sportier manner of driving is possible during a trip, and fewer acoustic insulation measures are required, because, due to the invention, discernible acoustic noises during the change in load can be reduced during the trip.

One embodiment provides that the first torque has an amount which is equal to zero before execution of step a), in which the first torque assumes an amount not equal to zero as the change in load. In other words, the method is implemented during a startup process, in which the change in load is the change in the amount of the first torque from zero to an amount which is not equal to zero. This means, for example, that the vehicle can start moving from a standstill due to the first torque. This embodiment has the advantage that a sportier drive setting can be achieved in that a quick start or a race start is enabled. In addition, increased comfort can be achieved during stop-and-go traffic or when maneuvering and parking in that a jolt is damped during startup.

A further embodiment provides that, in step b), the second torque is set with a defined amount in the direction which is opposite to the current direction of the first torque. This means that the defined amount can be used in order to set the second torque into the opposite direction as relates to the current direction of the first torque. Preferably, the defined amount may be less than the amount of the first torque such that a positive overall torque and thus an acceleration can be achieved in a direction due to the total of the respective torques. In particular, the defined amount may be an amount which sets the second torque at a value of from 5 to 20 newton meters. It is advantageous in this case that a sufficiently high amount is set in order to pre-load a drivetrain so that a change in load can be accommodated.

One embodiment provides that step b) further comprises a simultaneous increase in the first torque by the amount of the second torque, in the direction of the first torque, for the second defined timeframe. In other words, the first torque can be increased by the amount of the second torque for the second defined timeframe, in which the load change or the change in load can occur. This provides the advantage that the total of the two torques remains the same before and after implementation of the method within the second defined timeframe. This can reduce a jolt in the vehicle.

One embodiment provides that the method further comprises determining whether the second defined timeframe has elapsed as step c), and, if step c) is affirmed, a setting of the second torque in the direction of the first torque and a reducing of the first torque by the amount of the second torque are implemented simultaneously within a third defined timeframe, which follows the second defined timeframe. In other words, after the second defined timeframe, which may be required, for example, in order to carry out the change in load, a third defined timeframe may be provided, in which the second torque is set back in the direction of the first torque, and simultaneously the amount of the second torque is reduced such that a total of the respective torques remains the same within the third defined timeframe. The third defined timeframe may be, for example, the time which the second torque requires in order to set the direction as relates to the first torque. This setting of the second torque and the reducing of the first torque can occur, for example, by means of a suitable pre-control such as, for example, via ramp functions or filtered with filters such that a uniform transfer of torques takes place. The advantage of this embodiment is that the torques can be set back into the same direction after a change in load without a noticeable delay. In addition, energy can be saved due to the setting of the two torques into one direction, because negative torque no longer must be compensated for.

A further embodiment provides that the reducing of the first torque is implemented based on a sensor measurement, in which a power parameter of the first electric drive machine and a power parameter of the second electric drive machine are determined, and subsequently the first torque is regulated such that the total of the two power parameters remains constant. In other words, the first torque can be regulated such that a total of the power parameters of both electric drive machines remains the same. A power parameter in this case may be, for example, the torque which can be measured by a torque sensor; however, it may also be a current value, by means of which the power of the respective drive machine can be determined by means of a current sensor. For example, an overall electric power can be provided to both electrical drive machines, in which the power of the first electric drive machine is correspondingly reduced upon an increase in the electric power of the second drive machine. This embodiment provides the advantage that both electric drive machines can be regulated with one another or in dependency on one another without this resulting in a change in the overall torque. A jolt or a perceptible noise can hereby be reduced in the vehicle.

One embodiment provides that at least two wheels are attached to the first vehicle axle and at least two wheels are attached to the second vehicle axle, and each wheel has its own electric drive machine, in which the total of the torques of the wheels at the first vehicle axle provides the first torque and the total of the torques of the wheels at the second vehicle axle provides the second torque. Stated otherwise, each wheel of each vehicle axle can have its own electric drive machine, in which the torques of the first vehicle axle in combination form the first torque and the torques of the second vehicle axle in combination form the second torque. This results in the advantage that the method for operating a vehicle can be applied during a change in load, in which each wheel of the vehicle has its own electric drive machine.

A further aspect of the invention relates to a method for operating at least two electric drive machines in the event of a change in load, in which a first torque can be transferred to at least one wheel of a first vehicle axle by means of a first electric drive machine, and a second torque can be transferred to at least one wheel of a second vehicle axle by means of a second electric drive machine in which each torque is defined by an amount and by a direction. The drive control device is configured to determine whether a change in load is pending within a first definable timeframe and, in the event that a change in load is pending, to actuate the second electric drive machine to set the second torque for a definable timeframe with a direction which is opposite a current direction of the first torque. This results in equivalent advantages and variation options as with the method.

According to the invention, also provided is a motor vehicle having the drive control device. A motor vehicle in this case may be a motorcycle, a passenger car, a commercial vehicle, or a bus.

The invention also includes refinements of the drive control device according to the invention, which has features as they have already been described in association with the refinements of the method according to the invention. For this reason, the corresponding refinements of the drive control device according to the invention are not described again here.

The invention also comprises the combinations of the features of the described embodiments.

BRIEF DESCRIPTION OF THE FIGURES

Exemplary embodiments of the invention are described in the following. The following is shown.

DETAILED DESCRIPTION

Figure 1:
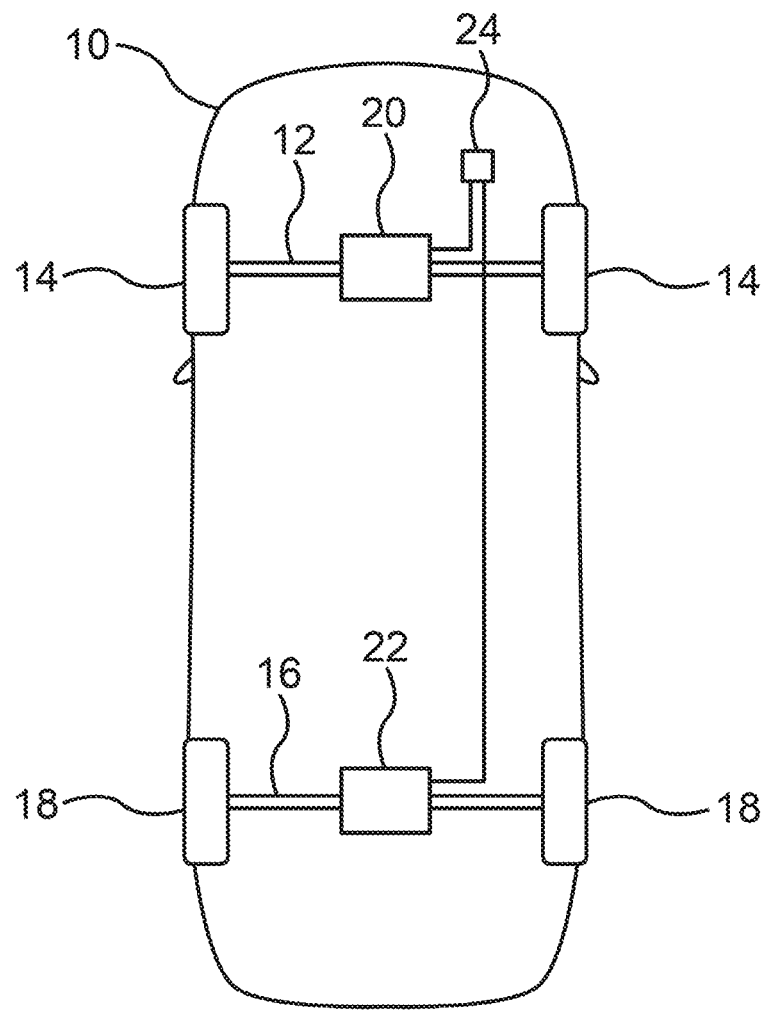
FIG. 1 a schematic view of an embodiment of a motor vehicle with a view of the bottom side of the motor vehicle.

The exemplary embodiments explained in the following refer to preferred embodiments of the invention. With the exemplary embodiments, the described components of the embodiments represent individual features to be considered independently of one another, which also further embody the invention independently of one another. Thus, the disclosure should also comprise combinations of the features of the embodiments other than those shown. Furthermore, the described embodiments can also be supplemented through further described features of the invention.

The same reference numerals refer to equivalent features and functions in the figures.

FIG. 1 shows a schematic representation of a bottom view of a motor vehicle 10. The motor vehicle 10, which is a passenger car in this example, may be in different embodiments, for example a motorcycle, a commercial vehicle, or a bus. The motor vehicle 10 has a first vehicle axle 12, to which at least one wheel or, as in this exemplary embodiment, two wheels 14 are attached. In addition, the motor vehicle 10 has a second vehicle axle 16, to which two wheels 18 are attached in this example.

In this exemplary embodiment, the first vehicle axle 12 is the front axle of the motor vehicle 10, and the second vehicle axle 16 is the rear axle of the motor vehicle 10; however, this may also be in reverse.

The motor vehicle 10 has at least two electric drive machines, in which a first electric drive machine 20 can generate a first torque, which can be transferred to the wheels 14 of the first vehicle axle 12. To this end, it may be provided that the first torque of the first electric drive machine 20 is transferred to the wheels 14 via a shaft. However, it may also be provided that the first electric drive machine 20 is installed in the wheels 14 and drives them there directly.

Similar to the first vehicle axle 12 with the first electric drive machine 20, a second electric drive machine 22 may be provided on the second vehicle axle 16, which drive machine can transfer a second torque to the wheels 18 of the second vehicle axle 16. The torque generated by the respective vehicle axle may be represented, for example, in a vectorial form with an amount and a direction.

Furthermore, a drive control device 24 is provided in the motor vehicle 10, which drive control device can control an operation of the first electric drive machine 20 and the second electric drive control device 22. In particular, the drive control device 24 can execute a method for operating the at least two electric drive machines upon a change in load of the motor vehicle 10. Alternatively, it may also be provided that several control devices are used which communicate with one another via a vehicle bus and which execute the method. A change in load in this case may be a load change of a vehicle, which means the transition from the propulsion mode into the traction mode of the drive machines.

Figure 2:
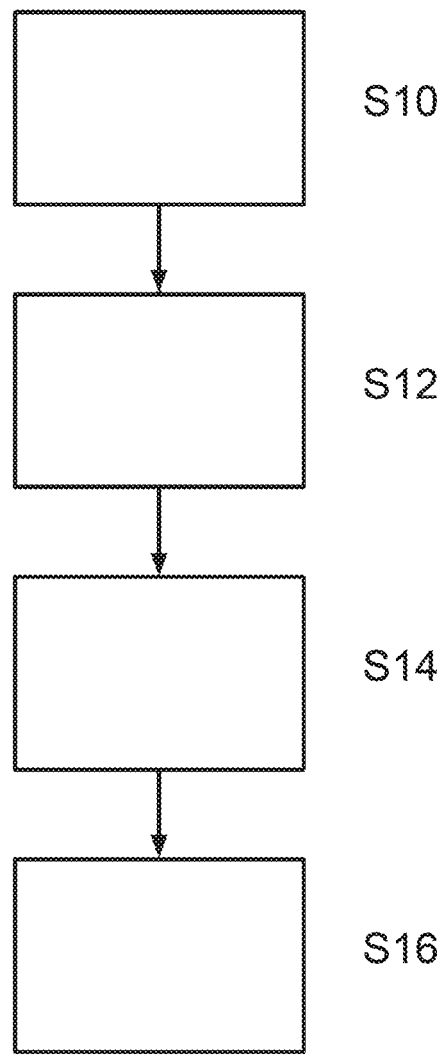
FIG. 2 a schematic method diagram of an embodiment of the method.

FIG. 2 shows a schematic method diagram of an embodiment of the method which can execute the drive control device 24 in the event of a change in load. In step S10, it is determined whether a change in load is pending within a first defined timeframe.

In this case, it may be, for example, that the first torque, which is generated by the first electric drive machine 20, is equal to zero, and the change in load is a change of the first torque to an amount not equal to zero. However, it is also conceivable that the first torque is not equal to zero, which means that the motor vehicle 10 may be moving. The determination as to whether a change in load is pending can be made, for example, by means of measured sensor data which are sent to the drive control device 24. The first defined timeframe in which the change in load may be pending can be suitably adapted through measurements and may amount, for example, to a few seconds.

In step S12, in the event that the determination as to whether the change in load is pending within the first defined timeframe is affirmed, a second torque is set, for example by the second drive machine 22 for a second definable timeframe, with a first direction, which is set opposite a current direction of a first torque, for example by the first electric drive machine 20. The amount of the second torque in this case can be set by means of a defined amount which is preferably less than the amount of the first torque, for example 20 newton meters. The second definable timeframe can preferably be selected such that the torque of the change in load or the load change is within this timeframe. In addition, the first torque is increased by the defined amount in step S12. This means that, during the determination that a change in load is pending, the second torque, with 20 newton meters for example, is set in the direction opposite as relates to the first torque, and the first torque is simultaneously increased by 20 newton meters. A compensation of the entire torque, i.e. the total of the first torque and of the second torque, can hereby be achieved, whereby a constant torque and thereby no delay results.

In step S14, it is determined by the drive control device 24 whether the second defined timeframe has expired, i.e. whether the load change has been completed.

If it is determined in step S14 that the second defined timeframe has expired, the second torque is set back in the direction of the first torque in step S16, and the first torque is simultaneously reduced by the amount of the second torque. This can be executed within a third defined timeframe, which follows the second defined timeframe. This third defined timeframe can be selected, for example, such that the setting of the second torque and the reducing of the first torque are not implemented instantaneously but instead increased by the drive control device 24 via a suitable pre-control such as, for example, via ramp functions, i.e. in stages, and/or the actuation signal for the first electric drive machine 20 and the second electric drive machine 22 can be adapted as desired using filter functions.

For example, it may also be provided that the reducing of the first torque by the amount of the second torque in step S16 is based on a sensor measurement, which measures a power parameter of the first electric drive machine 20 and a power parameter of the second electric drive machine 22 and subsequently regulates the two drive machines such that the total of the two power parameters remains constant. For example, the electric power that each drive machine requires can be measured in this case and, upon an increase in the electric power of the second electric drive machine 22, the electric power of the first electric drive machine 20 can be reduced such that the total of the electric power consumed overall remains constant in the direction of the first torque during the change in the second torque.

For example, through the method it can be achieved that the total torque always corresponds to a a tractive torque or braking or regenerative torque that is set or desired by a driver.

It can also be provided that the method implemented by the drive control device 24 is only executed when the speed of the motor vehicle 10 is within a threshold value. For example, this threshold value may be 50 km/h. Noises that occur during a load change can be covered up by general environmental noise or driving noise, for example, above this threshold value, whereby the application of the method is no longer necessary in order to damp noises during a load change. However, it may also be provided that the method shown is implemented upon each load change.

Figure 3A:
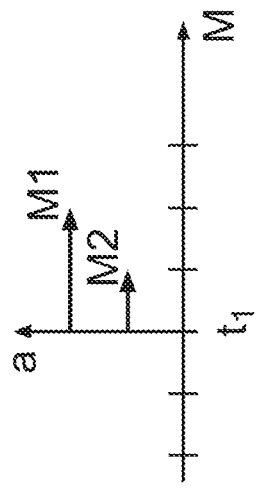
FIG. 3a a schematic diagram of torques at various points in time during a drive.
Figure 3A:
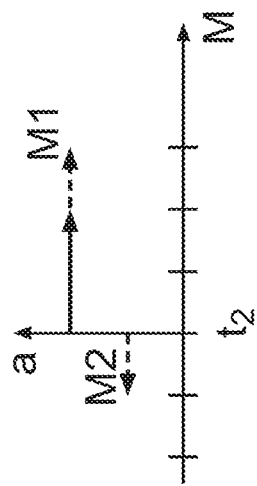
Figure 3A:
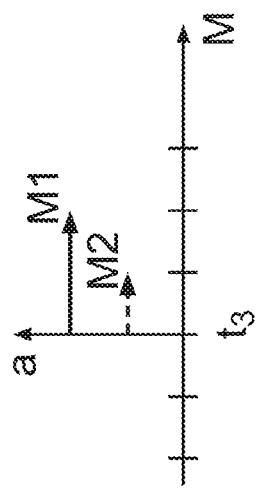
Figure 3B:
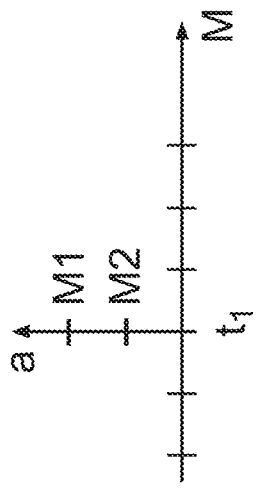
FIG. 3b a schematic diagram of torques at various points in time during a startup process.
Figure 3B:
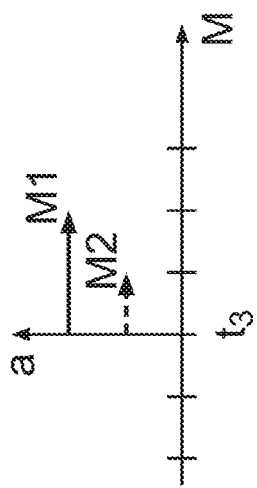

FIGS. 3a and 3b schematically show torques from two electric drive machines of a motor vehicle 10 at various points in time in an exemplary embodiment of the method. The amount of the torque is plotted in newton meters on the x-axis M, and a first torque M1 for a first electric drive machine 20 and a second torque M2 for a second electric drive machine 22 are shown on the y-axis.

In the exemplary embodiment shown in FIG. 3a, the motor vehicle 10 is in motion at point in time $t_1$, and the first torque M1 has an amount of 40 newton meters, and the second torque M2 has an amount of 20 newton meters.

It can then be determined, for example in method step S10, that a change in load is pending, upon which the second torque M2 is set in a direction that is opposite as relates to the first torque M1 at point in time $t_2$, which is indicated by a dashed line. In this example, the second torque M2 is set with an amount of 20 newton meters. At the same time, the first torque M1 can be increased by the amount of the second torque M2 (indicated by dashed line) and then have, for example, an amount of 60 newton meters.

Once it has been determined in method step S14 that the change in load is complete, the second torque M2 can then be set back in the direction of the first torque M1 in method step S16, for example back to an amount of 20 newton meters, which is shown at point in time $t_3$ in FIG. 3a. At the same time, the amount of the first torque M1 is reduced by the amount of the second torque M2, which is from 60 newton meters to 40 newton meters in this example.

In the exemplary embodiment shown in FIG. 3b, the motor vehicle 10 is stopped at point in time $t_1$, and the first torque M1 and the second torque M2 have an amount equal to zero.

At point in time $t_2$, the first torque M1 can assume an amount not equal to zero upon a startup process, for example an amount of 40 newton meters, which is indicated as a dashed line. This pending change in load is determined in method step S10, whereby the second torque M2 is set in a direction opposite of the first torque M1 (shown in a dashed line), for example with an amount of 20 newton meters. The first torque M1 is simultaneously increased by this amount of 20 newton meters to reach 60 N meters.

After the change in load which occurs during the startup process, it is determined in method step S14 that the change in load is complete, and the second torque M2 is set back in the direction of the first torque M1 at point in time $t_3$ in method step S16, with an amount of, for example, 20 newton meters. At the same time, the first torque M1 is reduced by the 20 newton meters to an amount of 40 newton meters.

In another exemplary embodiment, there is an aspect in that the torque of the individual drive machines, i.e. the first electric drive machine 20 and the second electric drive machine 22, is enabled to act oppositely on an as-needed basis. In conspicuous operating ranges, i.e. in the event of a change in load, one drive machine is in propulsion and the other sets a braking torque, i.e. a torque opposite as relates to the first direction. The drivetrain can thereby be loaded and both drive machines are in a defined position in which the toothed flanks can make contact.

In critical situations, for example when stopping or starting, the desired torque can always first be established with the drive machine that is already moved to the correct side. The other drive machine initially functions oppositely as a brake and subsequently sets the desired torque with a time delay using ramps. This formation or distribution of torques can be represented as desired using suitable pre-control such as ramps or filters.

There can also be various driving programs in the drive control device 24, i.e. torque specifications for both drive machines as a function of the speed or the rotational speed, the driver's request, the driving stage, the driving program, and/or the road slope.

As a whole, the example shows how torque formation can be provided to two axles, which are electrically driven independently of one another, by means of the invention.

The invention claimed is:

1. A method for operating at least two electric drive machines in the event of a change in load of a vehicle, wherein a first torque can be transferred to at least one wheel of a first vehicle axle by a first electric drive machine, and a second torque can be transferred to at least one wheel of a second vehicle axle by a second electric drive machine, wherein each torque is defined by an amount and by a direction, comprising the following steps:
   a) determining whether a change in load is pending within a first defined timeframe;
   b) in the event step a) is affirmed: setting the second torque for a second definable timeframe with a direction which is opposite a current direction of the first torque.

2. The method according to claim 1, wherein the first torque has an amount which is unequal to zero before the execution of step a), wherein a load change is implemented in which the second torque changes its direction as the change in load.

3. The method according to claim 1, wherein the first torque has an amount which is equal to zero before execution of step a), wherein the first torque assumes an amount not equal to zero as the change in load.

4. The method according to claim 1, wherein, in step b), the second torque is set with a defined amount in the direction which is opposite as relates to the current direction of the first torque.

5. The method according to claim 1, wherein step b) further comprises: a simultaneous increase in the first torque by the amount of the second torque, in the direction of the first torque, for the second defined timeframe.

6. The method according to claim 1, further comprising the following steps:
   c) determining whether the second defined timeframe has expired;
   d) if step c) is affirmed, the following steps are implemented simultaneously within a third defined timeframe which follows the second defined timeframe:

setting the second torque in the direction of the first torque;

reducing the first torque by the amount of the second torque.

7. The method according to claim 6, wherein the reducing of the first torque is implemented based on a sensor measurement, in which a power parameter of the first electric drive machine and a power parameter of the second electric drive machine are determined, and subsequently the first torque is regulated such that the total of the two power parameters remains constant.

8. The method according to claim 1, wherein at least two wheels are attached to the first vehicle axle and at least two wheels are attached to the second vehicle axle, and each wheel has its own electric drive machine, wherein the total of the torques of the wheels at the first vehicle axle provides the first torque and the total of the torques of the wheels at the second vehicle axle provides the second torque.

9. A drive control device for operating at least two electric drive machines in the event of a change in load, wherein a first torque can be transferred to at least one wheel of a first vehicle axle by a first electric drive machine, and a second torque can be transferred to at least one wheel of a second vehicle axle by a second electric drive machine, wherein each torque is defined by an amount and by a direction, wherein the drive control device is configured to determine whether a change in load is pending within a first definable timeframe and, in the event that a change in load is pending, to actuate the second electric drive machine to set the second torque for a definable timeframe with a direction which is opposite a current direction of the first torque.

10. A motor vehicle having the drive control device according to claim 9.

11. The method according to claim 2, wherein, in step b), the second torque is set with a defined amount in the direction which is opposite as relates to the current direction of the first torque.

12. The method according to claim 3, wherein, in step b), the second torque is set with a defined amount in the direction which is opposite as relates to the current direction of the first torque.

13. The method according to claim 2, wherein step b) further comprises: a simultaneous increase in the first torque by the amount of the second torque, in the direction of the first torque, for the second defined timeframe.

14. The method according to claim 3, wherein step b) further comprises: a simultaneous increase in the first torque by the amount of the second torque, in the direction of the first torque, for the second defined timeframe.

15. The method according to claim 4, wherein step b) further comprises: a simultaneous increase in the first torque by the amount of the second torque, in the direction of the first torque, for the second defined timeframe.

16. The method according to claim 2, further comprising the following steps:
c) determining whether the second defined timeframe has expired;
d) if step c) is affirmed, the following steps are implemented simultaneously within a third defined timeframe which follows the second defined timeframe:
setting the second torque in the direction of the first torque;
reducing the first torque by the amount of the second torque.

17. The method according to claim 3, further comprising the following steps:
c) determining whether the second defined timeframe has expired;
d) if step c) is affirmed, the following steps are implemented simultaneously within a third defined timeframe which follows the second defined timeframe:
setting the second torque in the direction of the first torque;
reducing the first torque by the amount of the second torque.

18. The method according to claim 4, further comprising the following steps:
c) determining whether the second defined timeframe has expired;
d) if step c) is affirmed, the following steps are implemented simultaneously within a third defined timeframe which follows the second defined timeframe:
setting the second torque in the direction of the first torque;
reducing the first torque by the amount of the second torque.

19. The method according to claim 5, further comprising the following steps:
c) determining whether the second defined timeframe has expired;
d) if step c) is affirmed, the following steps are implemented simultaneously within a third defined timeframe which follows the second defined timeframe:
setting the second torque in the direction of the first torque;
reducing the first torque by the amount of the second torque.

20. The method according to claim 2, wherein at least two wheels are attached to the first vehicle axle and at least two wheels are attached to the second vehicle axle, and each wheel has its own electric drive machine, wherein the total of the torques of the wheels at the first vehicle axle provides the first torque and the total of the torques of the wheels at the second vehicle axle provides the second torque.

* * * * *